United States Patent
Burch et al.

(10) Patent No.: US 7,209,710 B2
(45) Date of Patent: Apr. 24, 2007

(54) BANDWIDTH MANAGEMENT IN A WIRELESS MEASUREMENT SYSTEM USING STATISTICAL PROCESSING OF MEASUREMENT DATA

(75) Inventors: Jefferson B. Burch, Palo Alto, CA (US); Bruce Hamilton, Menlo Park, CA (US); Nikhil Sharma, Chicago, IL (US); Glenn R. Engel, Snohomish, WA (US); Glen L. Purdy, Jr., Snohomish, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 242 days.

(21) Appl. No.: 10/698,292

(22) Filed: Oct. 31, 2003

(65) Prior Publication Data

US 2005/0096049 A1    May 5, 2005

(51) Int. Cl.
    *H04B 17/00* (2006.01)
(52) U.S. Cl. .............. 455/67.11; 455/67.14; 455/423; 455/424; 702/179; 702/182
(58) Field of Classification Search ............ 455/67.11, 455/67.14, 423, 424, 456.1; 702/179, 182, 702/183, 185, 187
See application file for complete search history.

(56) References Cited

U.S. PATENT DOCUMENTS

| | | | |
|---|---|---|---|
| 4,940,976 A | | 7/1990 | Gastouniotis et al. |
| 5,425,076 A | * | 6/1995 | Knippelmier ............ 379/27.04 |
| 5,539,645 A | | 7/1996 | Mandhyan et al. |
| 5,805,200 A | * | 9/1998 | Counselman, III ..... 342/357.08 |
| 5,852,409 A | | 12/1998 | Bell |
| 5,892,758 A | | 4/1999 | Argyroudis |
| 5,987,306 A | * | 11/1999 | Nilsen et al. ............ 455/67.11 |
| 5,987,320 A | * | 11/1999 | Bobick ........................ 455/423 |
| 6,163,276 A | * | 12/2000 | Irving et al. ............. 340/870.4 |
| 6,169,896 B1 | * | 1/2001 | Sant et al. ................... 455/424 |
| 6,219,544 B1 | * | 4/2001 | Suutarinen .................. 455/423 |
| 6,401,054 B1 | * | 6/2002 | Andersen .................... 702/179 |
| 6,459,898 B1 | * | 10/2002 | Yegenoglu et al. ......... 455/427 |
| 6,563,460 B2 | * | 5/2003 | Stilp et al. .................. 342/457 |
| 6,580,983 B2 | * | 6/2003 | Laguer-Diaz et al. ......... 701/35 |
| 6,625,448 B1 | * | 9/2003 | Stern ........................... 455/425 |
| 6,711,404 B1 | * | 3/2004 | Arpee et al. ................ 455/423 |
| 6,754,470 B2 | * | 6/2004 | Hendrickson et al. ... 455/67.11 |
| 6,807,515 B2 | * | 10/2004 | Vogel et al. ................ 702/188 |
| 6,873,601 B1 | * | 3/2005 | Chow et al. ................ 370/254 |
| 6,914,944 B1 | * | 7/2005 | Nokkonen et al. .......... 375/324 |
| 6,915,128 B1 | * | 7/2005 | Oh .............................. 455/424 |
| 6,928,280 B1 | * | 8/2005 | Xanthos et al. ............. 455/423 |
| 2002/0069037 A1 | * | 6/2002 | Hendrickson et al. ...... 702/186 |
| 2003/0064720 A1 | * | 4/2003 | Valins et al. ................ 455/423 |

(Continued)

FOREIGN PATENT DOCUMENTS

EP      0 715 285      11/1995

OTHER PUBLICATIONS

European Search Report dated Dec. 7, 2004.
Smith, Ronald D., "Building IEEE 1451.2 Smart Transducer Interface Modules (STIMs)", Telemonitor, Inc., Columbia, Maryland, 11 pages, May 2000.

(Continued)

*Primary Examiner*—William Trost
*Assistant Examiner*—James D. Ewart

(57) ABSTRACT

A system and method is disclosed for managing bandwidth in a wireless probe measurement system that may include receiving an indicator at the wireless probe to begin taking measurements of one or more variables, measuring the one or more variables, calculating a set of statistical values at the wireless probe using the measured one or more variables, and transmitting the set of statistical values to a central station.

46 Claims, 4 Drawing Sheets

U.S. PATENT DOCUMENTS

2003/0162539 A1* 8/2003 Fiut et al. .................... 455/424
2004/0176040 A1* 9/2004 Thornton et al. ......... 455/67.11
2004/0203437 A1* 10/2004 Burch et al. ............. 455/67.11

OTHER PUBLICATIONS

Johnson, Robert N., Proposed IEEE Standard P1451.0 "Defining the Core Features of Smart Sensors to Facilitate Broader Adoption", Jun. 2003, Telemonitor, Inc., pp. 1-9.

Johnson, Robert N. et al, "Overview and Status Update for IEEE 1451.2: Transducer to Microprocessor Communicatons Protocols and Transducer Electronic Data Sheet (TEDS) Formats", Telemonitor, Inc., pp. 1-8, May 2000.

Johnson, Robert N. et al, Overview and Status Update for IEEE 1451.2, May 9, 2000, Sensors Expo, Anaheim, pp. 1-37.

Lee, Kang. "Wireless Sensing and IEEE 1451", Sensors Conference / Expo 2001, Jun. 4, 2001, National Institute of Standarads and Technology United States Department of Commerce, 27 pages.

* cited by examiner

BANDWIDTH MANAGEMENT IN A WIRELESS MEASUREMENT SYSTEM USING STATISTICAL PROCESSING OF MEASUREMENT DATA

TECHNICAL FIELD

The present invention relates, in general, to wireless communication and, more specifically, to managing bandwidth using statistical measurements

BACKGROUND OF THE INVENTION

Data measurement using measurement probes and tools has been a common practice since the advent of measuring tools. The earliest tools, such as sun dials, wind vanes, sextants, and the like, were manually or naturally driven with the data simply written down or remembered. Newer probes include temperature sensors, weather probes, radio frequency (RF) sensors, global positioning system (GPS) receivers, and the like, are now driven by computers and electronics. The modern trend has evolved to using wireless probes for certain types of measurement tasks. Generally, a measurement task that may be targeted in stationary, remote locations or events that may be tracked across a wide area are all good candidates to use wireless measurement probes. For example, probes measuring wireless communication networks, traffic patterns, pollution levels, environmental conditions, and the like, are each have use for a remote probe that sends its measurements over the airwaves. This process generally relieves the cost to place human resources in the field and also allows for probes to be placed in extreme areas that may not typically be accessible or inviting to humans. By using a wireless probe, there is no need to run cabling to the remote location, which both relieves the costs involved for the cabling, but also may diminish the impact on the environment.

One of the problems with wireless probes, however, is the data bandwidth limitations of the wireless networks. Most measurement probes are capable of taking measurements at a rate well in excess of the rate at which the measured data can be transmitted over the wireless network. This data throughput mismatch creates a problem in getting the measured information to the processing point. Either data will have to be dropped or will have to be saved. Current solutions for mobile-type wireless probes generally involve the probe attached to a large storage facility, such as a large hard disk, or other type of storage. While this allows for a large amount of data to be measured and used in analysis, the measured data needs to be downloaded from the storage at the processing center before any processing may be done. Other solutions have involved the use of "smart" probes, which are probes that have a limited amount of embedded processing functionality. These smart probes may be programmed to control the actual measure-taking in some limiting, yet logical, fashion.

Such smart probes may be used to control the measurement process in bandwidth-sensitive ways. For example, if a phenomenon to be measured is really only interesting for a certain period of time, the probe may be programmed to make its measurements only during the times of interest. Similarly, if the phenomenon were only present in certain locations, the probe may be programmed to make measurements only when it is in those zones or locations of interest. Moreover, there may be phenomena that are interesting over a combination of time and location. In these cases, the probe may be programmed to measure only in the interesting times and locations. By strategically limiting the measurement process, the amount of raw data collected may be greatly reduced. However, while these measurement strategies greatly reduce the amount of raw measurement data is collected, the amount of data that may be collected by a probe within the limited zones of interest may still overwhelm any available bandwidth resources.

BRIEF SUMMARY OF THE INVENTION

Representative embodiments of the present invention are directed to a method for managing bandwidth in a wireless probe measurement system comprising receiving an indicator at the wireless probe to begin taking measurements of one or more variables, measuring the one or more variables, calculating a set of statistical values at the wireless probe using the measured one or more variables, and transmitting the set of statistical values to a central station.

Further representative embodiments of the present invention are directed to a wireless probe for measuring desired phenomena that may include a processor, a transducer for capturing measurements, code operable by the processor, for calculating statistical information on the captured measurements, and a communication interface for transmitting the statistical information to a data clearinghouse.

Still further representative embodiments of the present invention are directed to a method measuring desired phenomena using a wireless probe that may include measuring one or more variables related to the desired phenomena, calculating statistical data at the wireless probe using the measured one or more variables, responsive to receiving a transition event notification, and transmitting the statistical data to a central processing location.

Additional representative embodiments of the present invention are directed to a method for analyzing desired phenomena in a defined area using a plurality of wireless probes, the method that may include dividing the defined area into a grid having a plurality of grid sections, taking raw measurements related to the desired phenomena across the defined area, determining a location of each of the raw measurements, assigning each of the raw measurements to one of the plurality of grid sections responsive to the location falling within a perimeter of the one of the plurality of grid sections, calculating statistical data at the wireless probe using the raw measurements, and communicating the statistical data to a central analysis center.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
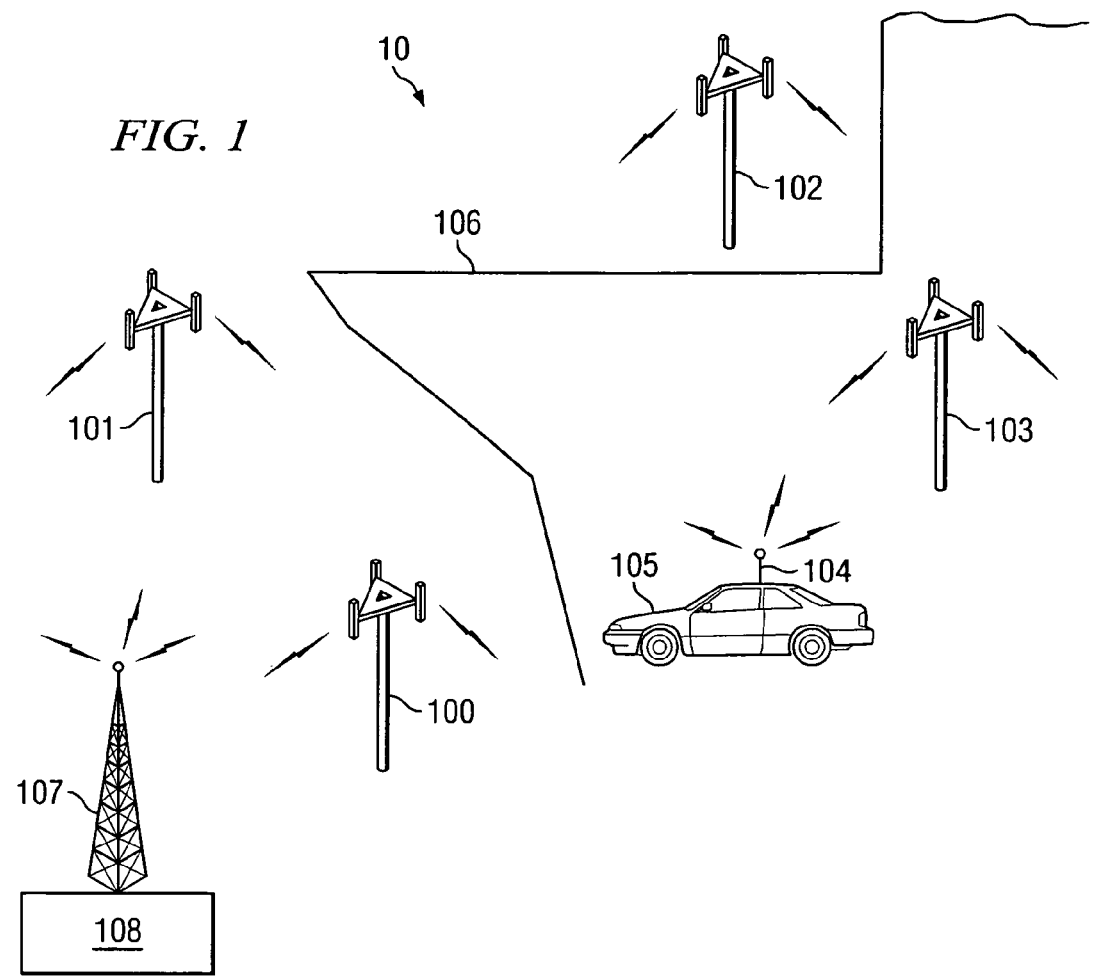
FIG. 1 is a block diagram illustrating a cellular network.

In one embodiment of the bandwidth management system described herein, RF probes are used to measure attributes of a cellular telephone network. FIG. 1 is a block diagram illustrating cellular network 10. Cellular network 10 comprises wireless antennae 100–103 each covering an assigned cell in network 10. RF probe 104 is attached to vehicle 105, which may be a maintenance vehicle or simply a public transportation vehicle, such as a taxi, bus, or the like, contracted with to carry RF probe 104. RF probe 104 typically includes a transducer for perceiving the raw measurements and may also include a processor for processing measurement information and for implementing configuration data. As vehicle 105 travels along path 106, measurements, such as the signal strength, frequency drift, or the like may be taken by RF probe 104. These raw measurements, or data derived therefrom, may then be periodically transmitted from RF probe 104 to telecom base station 106 through measurement antenna 107. The majority of the complex analysis is then performed at telecom base station 106, or other such data clearinghouse or central processing location, to analyze cellular network 10.

It should be noted that the application of the present invention is not limited to testing RF attributes of cellular networks. The system depicted in FIG. 1 could easily be applied to other measurement phenomena. One example may be pollution monitoring. The mobile probe may take a series of air quality measurements along path 106, in which antennae 100–103 may actually represent industrial facilities, highway locations, or the like. Thus, the example described in FIG. 1 does not limit, and is not intended to limit, the application of various embodiments of the present invention.

The measurement process implemented by RF probe 104 may be controlled using a time/distance algorithm. For example, the probe may be directed to make a measurement every 'X' meters. However, if the probe determines that it is moving very fast, very slowly, or is stopped altogether, the algorithm may change to direct a measurement be taken every 'Y' seconds, if moving too slowly, or, if moving too quickly, then once 'X' meters have elapsed, a check is made that 'Z' seconds have also elapsed before taking the next measurement, where 'Z' is less than 'Y'.

Figure 2:
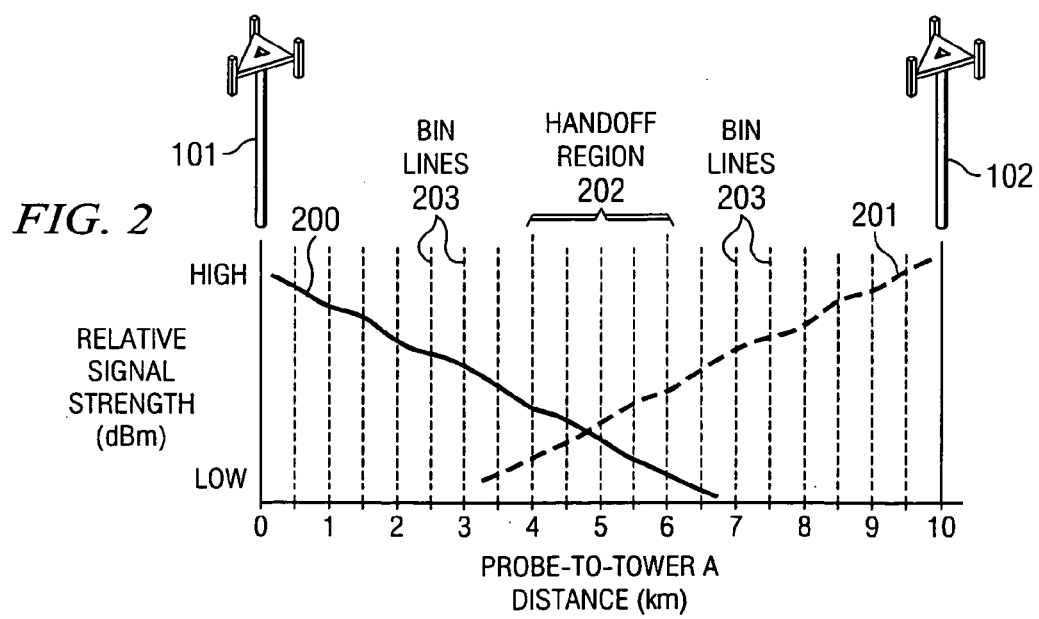
FIG. 2 is a graph illustrating the relative signal strength between two of the antennae shown in FIG. 1 as a function of the distance to the antennae.

FIG. 2 is a graph illustrating the relative signal strength between antennae 101 and 102, as shown in FIG. 1, as a function of the distance to the antennae. As RF probe 104 (FIG. 1) becomes farther away from antenna 101, the signal strength, shown by strength indicator 200, decreases. Similarly, as RF probe 104 (FIG. 1) gets closer to antenna 102, the signal strength, shown by strength indicator 201, increases. In well-designed cellular networks, an overlap of signal strength indicators 200 and 201 occurs at handoff region 202, where a mobile phone on the cellular network would be transferred from antenna 101 to antenna 102. Because the signal strength from antennae 101 and 102 varies considerably through out the region, a large number of data measurements would be required to characterize it. However, because signal strength is strongly correlated with distance from the antenna, a smart probe can fit the raw measurements to a mathematical model of the phenomenon. Only the statistical properties of the model would be transmitted off of the probe. In this case, the model is a linear relationship of signal strength versus distance from the antenna. Therefore, the slope, intercept, and linear correlation coefficient would be sufficient to character it. This results in a tremendous reduction in information to be transmitted off of the probe.

Half-kilometer bin lines 200 indicate bins between antennae 101 and 102 that delimit areas in which the signal strength may not vary considerably within the particular half-kilometer bin. Using such a separated breakdown, statistical analysis may be used to analyze the attributes of the antennae because the relative signal strength within any given bin should not generally vary to any large extent.

Figure 3:
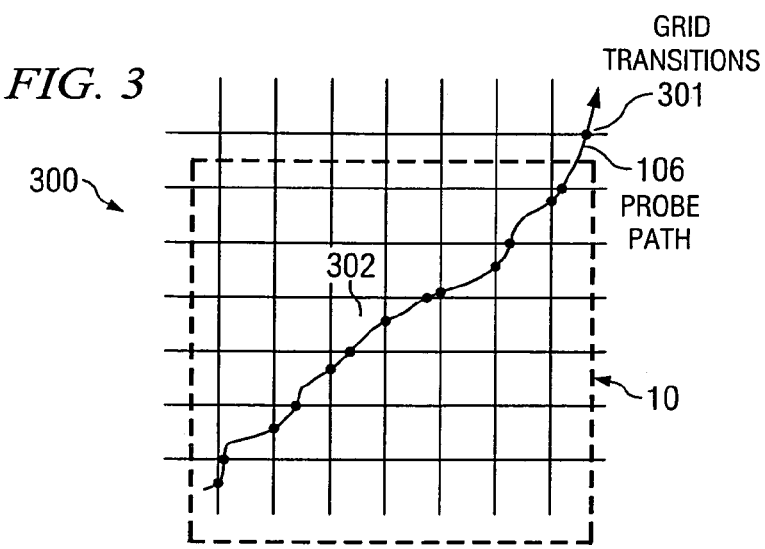
FIG. 3 is a block diagram illustrating a grid overlaid onto the area covered by cellular network.

FIG. 3 is a block diagram illustrating grid system 300 overlaid on the area covered by cellular network 10. Grid system 300 results in a plurality of bins defined by the grid lines. The raw measurements that are taken by the probe may be allocated to a specific bin depending on the location at which that measurement was taken. A probe operable with one embodiment of the present invention may include some kind of direction/location finding instrument, such as a Global Positioning Satellite (GPS) mechanism, or the like, to stamp the raw measurements with a location. Using that location, these raw measurements may be assigned to that specific bin.

Part of the analysis of a particular phenomena may be to check for certain alarm conditions. For example, in cellular network 10, if the signal power falls below a certain level, the cell may fail, dropping calls and possibly causing a communication crisis. Similarly, if signal power is too strong, there may be interference with neighboring cells. Therefore, knowing the level of a single raw measurement may be beneficial to the analyzing authority. As the raw measurements are taken by the probe, the probe may compare those measurements to certain alarm conditions for the phenomena being tested. If an alarm condition is exceeded, the probe may issue an alarm. When using a wireless measurement system, it is beneficial to assign a priority level to the communications in order to give a higher priority to the limited bandwidth for more important data. An alarm issued by a probe may be classified as a high priority message, which is sent to the central station over other communication.

One embodiment of the present invention uses statistical calculations performed on the probe to reduce the amount of data transmitted to the central station. Referring back to FIG. 3, as a probe traverses bin 302, it may take one hundred, one thousand, or other large number of measurements, such as signal strength, frequency, or the like. Instead of transmitting those raw measurements, the probe may calculate certain statistical values, such as the min, mode, mean, median, standard deviation, skew, and max of the N measurements (where N is the number of measurements, i.e., 100 or 1000, as noted above). These seven statistical values may be used to perform a large variety of analyses on the performance of the cellular network in bin 302. Therefore, when reporting to the central system on the measurements for bin 302, the probe, in the above example, transmits only the seven calculated statistical values instead of the N measurements. If a statistical system other than the simple linear system is selected, other statistical variables may be calculated. Therefore, the present invention is not limited to transmitting only seven values. Regardless of the statistical system selected, depending on how many 'N' is, there is possibility for a substantial reduction in the data to be transmitted.

Figure 4:
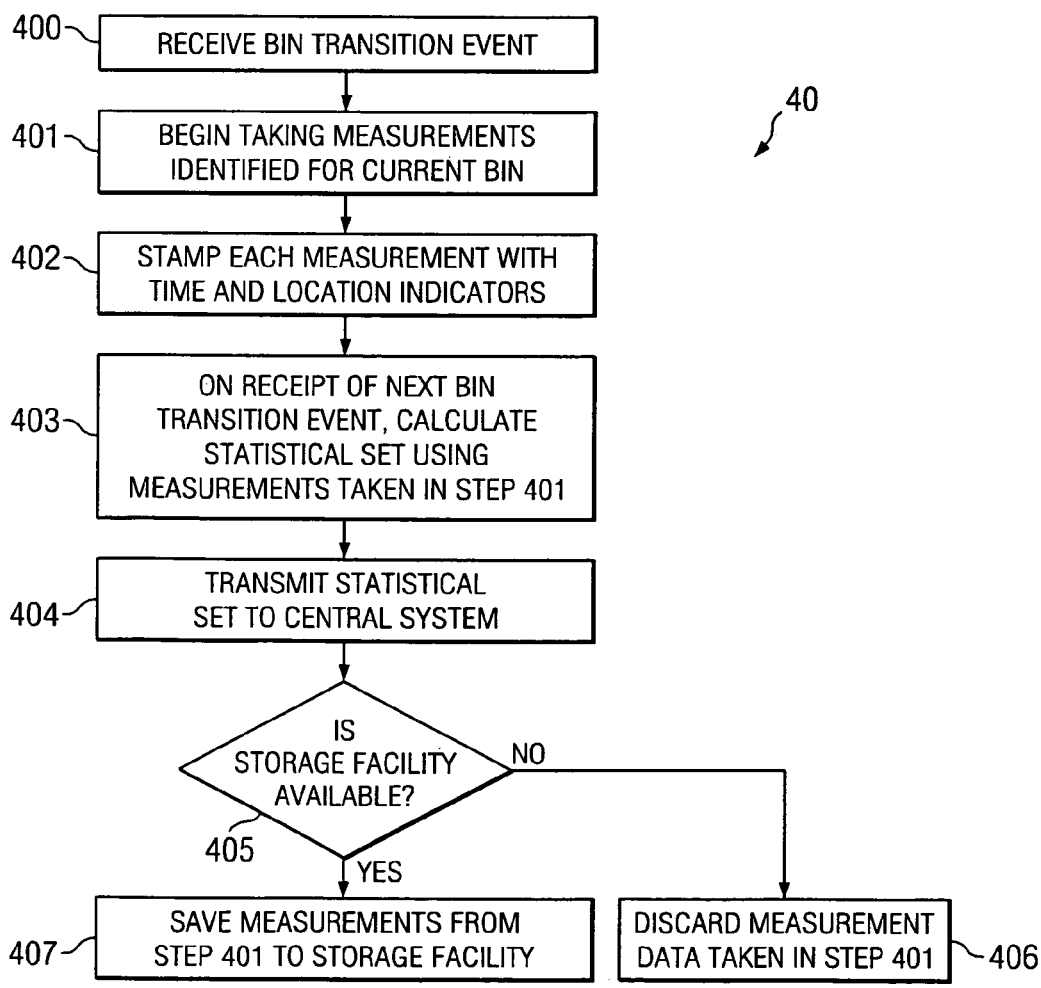
FIG. 4 is a flowchart illustrating a statistical bandwidth management system configured according to one embodiment of the present invention.

FIG. 4 is a flowchart illustrating statistical bandwidth management system 40 configured according to one embodiment of the present invention. In step 400 the probe begins taking raw measurements associated with that particular bin. Each measurement value may then be stamped, in step 401, with the time and location of the measurement for future reference. In step 402, on receipt of a bin transition event, the probe calculates a set of statistical values using the measurements taken in step 400 associated with a particular bin. The set of statistical values may include values such as the mean, standard deviation, mode, and the like, or may even comprise an intermediate statistical value, such as a summation of a particular measured value or the summation of a particular value at different portions within the same bin. That set of statistical values may then be transmitted from the probe to the central system in step 403. A determination may be made, in step 404, in selected embodiments of the present invention whether local storage is available to and accessible by the probe. If such local storage is not available, the probe discards the raw data measured in step 400. If local storage is available to the probe, the measurements from step 400 may be saved therein for future access. The amount of raw measurements to be stored may also be reduced by decimating the measurements to keep the important information, but reduce the sheer amount of measurements that may have been taken. Local storage may take various forms of memory, such as dynamic memory, flash memory, hard disks, and the like.

In operation, a single wireless probe may pass through any particular bin of interest only randomly. Therefore, using only a single probe may increase the unreliability of the measured data because of the infrequency of the measurement any may also leave some bins unmeasured altogether. In many systems, multiple probes are used to gather measurement information. This information may then be aggregated at the central station to more accurately analyze the different bins of interest. To accommodate this aggregation at the central station, the set of statistical values calculated and transmitted may be limited to intermediate statistical values, such as the summation of particular measurements. In such embodiments, a single probe may calculate the summation of a particular measurement, X, and send the statistical values N and $\Sigma_{1-N}X$. When each of the statistical values is received from the different probes in the field, the central station is then able to aggregate the measurements into a larger population using the different sample sizes, $N_1-N_m$, and summations $\Sigma_{1-N}X_1-\Sigma_{1-N}X_m$, $\Sigma_{1-N}X_1^2-\Sigma_{1-N}X_m^2$, $\Sigma_{1-N}X_1^3-\Sigma_{1-N}X_m^3$, where each of $N_1-N_m$ and $X_1-X_m$ are the sample size and measurements for probes 1-m making measurements in the target bin. The square and other higher-ordered summations may be used in calculating other statistical variables, such as standard deviation and the like. Therefore, for example, in calculating the aggregate mean, which is just a single example of a statistical variable that may be calculated, for the particular bin, the central stations may calculate:

$$\text{Aggregate Mean} = (\Sigma X_1 + \Sigma X_2 + \ldots \Sigma X_m)/(N_1 + N_2 + \ldots N_m) \quad (1)$$

Linear statistical schemes, which include the mean, standard deviation, and the like, are just one type that may be used. Other schemes, such as exponential, Poisson, uniform, and the like, may also be used. However, the probe should transmit the type of statistical scheme being used along with the statistical value set.

As noted above, if the bin size is too small, the savings in the number of measurements per bin or grid is offset by the number of measurements for each of the multiple bins. An alternative to calculating single variable measurement/calculation is to increase the bin or grid size and use multiple measurement/calculations which may then be cross-correlated to obtain the statistical analysis. The process in implementing the multi-variable descriptive statistics is similar to the steps identified in FIG. 4. However, the set of statistical values calculated by the probes would be different. For example, in the linear statistical scheme, as described in the previous examples, considering three different measured variables, X1, X2, and X3, the following terms may be calculated and transmitted to the central station during the grid transition events:

Sample size: N
Linear Terms: $\Sigma X_1$, $\Sigma X_2$, $\Sigma X_3$
Second Order Terms: $\Sigma X_1^2$, $\Sigma X_2^2$, $\Sigma X_3^2$
Third Order Terms: $\Sigma X_1^3$, $\Sigma X_2^3$, $\Sigma X_3^3$
Linear Cross Terms: $\Sigma X_1 X_2$, $\Sigma X_1 X_3$, $\Sigma X_2 X_3$
Second Order Cross Terms: $\Sigma X_1^2 X_2$, $\Sigma X_1^2 X_3$, $\Sigma X_2^2 X_3$
Other Terms: $\Sigma X_1 X_2 X_3$, $\Sigma X_1^2 X_2 X_3$, $\Sigma X_1 X_2^2 X_3$, $\Sigma X_1 X_2 X_3^2$ And so forth, calculating and transmitting the various cross terms, double cross terms and triple cross terms.

Figure 5:
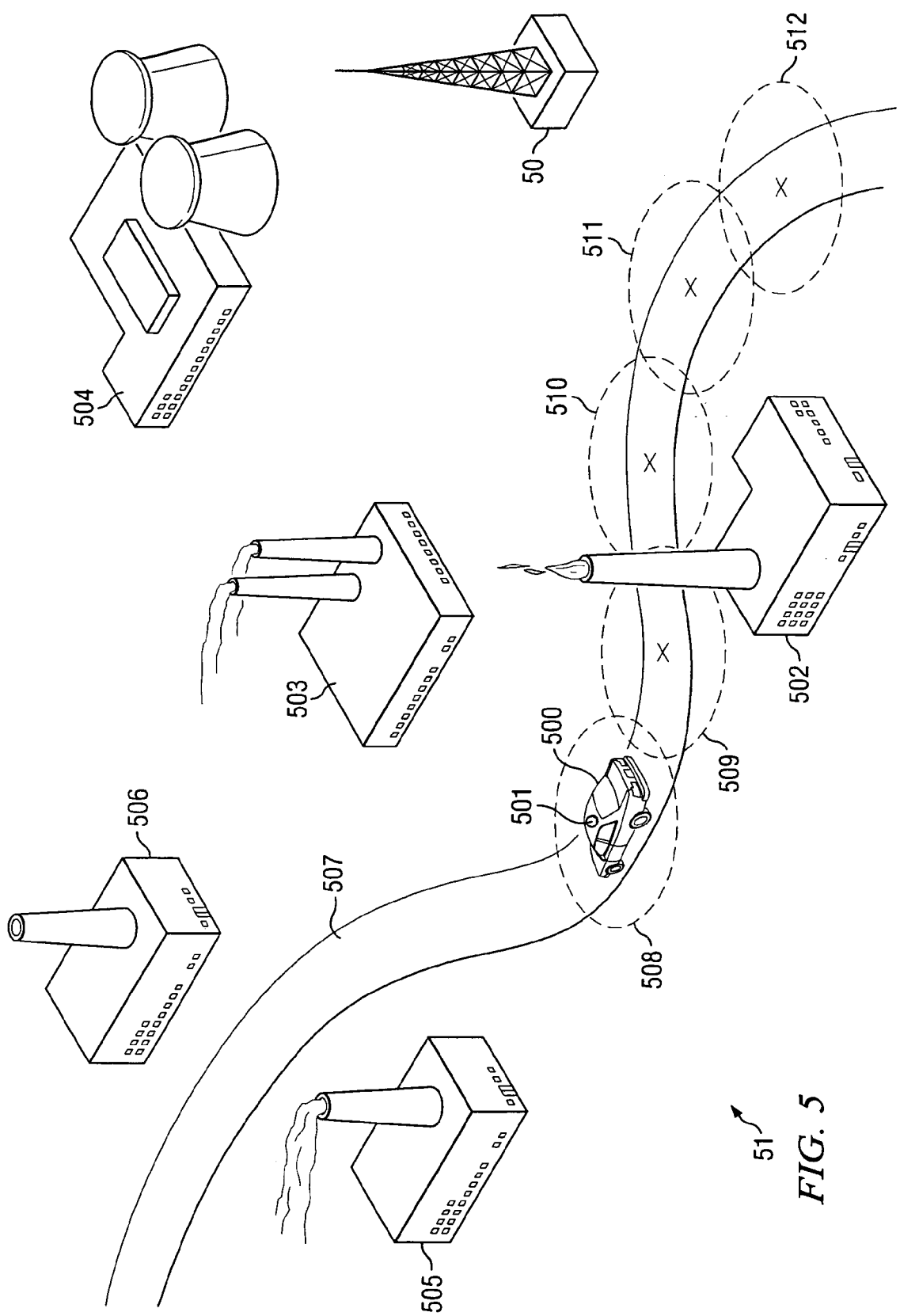
FIG. 5 is a block diagram illustrating an area to be tested for desired phenomena.

In another embodiment of the present invention, an area to be tested may be dynamically gridded by the probe, instead of having a static artificial grid overlaid onto the area. FIG. 5 is a block diagram illustrating area 51 to be tested for desired phenomena. Area 51 has been designated as an area in which testing of certain environmental conditions is desired. Industrial facilities 502–506 each have pollutant-emitting processes that should be monitored from time to time. Mobile transport 500, which may be some sort of automobile, includes wireless measurement probe 501. Instead of predetermining a grid system onto area 51, the measurement system illustrated in FIG. 5, includes a dynamic gridding mechanism implemented by wireless measurement probe 501. As mobile transport 500 traverse road 507, measurements are taken. Wireless measurement probe 501 takes each measurement and compares those measurements to previously calculated statistics calculated from previous measurements. When wireless measurement probe 501 determines that the raw measurement begins to differ from the statistical value by a certain amount, a statistical transition event is noted. In response to the transition event, a new statistical bin is created. The measurements made within that bin will be compared to the statistics for the new, dynamic bin and added to the statistical calculation. As the measurements begin to differ again, a new statistical transition event is noted and another statistical bin in created. In this manner, wireless measurement probe 501 dynamically grids area 51 into statistically compatible regions. As each statistical bin is closed, wireless measurement probe 501 transmits the statistical information to central station 50.

In operation, wireless measurement probe compares each raw measurement to the calculated statistics in current statistical bin 508. FIG. 5 also illustrates statistical bins 509–512 along road 507. At the beginning of mobile transport 500's travel, measurement were taken within statistical bin 512 with statistical variables calculated therein. As mobile transport 500 came closer to the area shown as statistical bin 511, the measurements may have begun to vary from the statistical norm of bin 512. When the measurements exceeded the statistics of bin 12 by a certain amount, statistical bin 512 was closed with the statistical calculations therefor transmitted from wireless measurement probe 501 to central station 50. At the same time, statistical bin 511 was opened with raw measurements being compared to the statistics calculated for bin 511. The process continues through bins 511–508.

Figure 6:
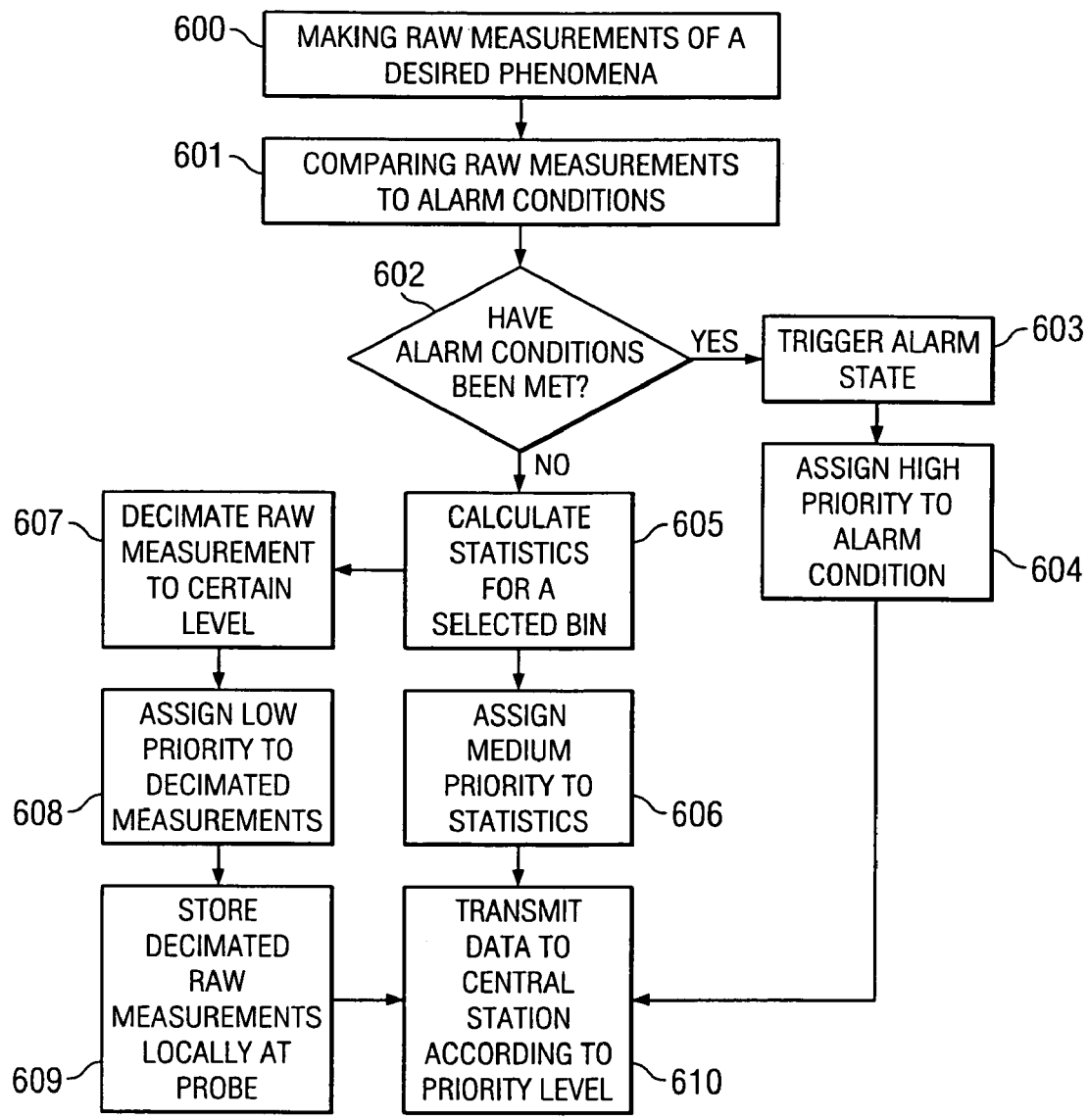
FIG. 6 is a flow chart illustrating steps executed in implementing another embodiment of the present invention.

FIG. 6 is a flow chart illustrating steps executed in implementing another embodiment of the present invention. In step 600, measurements are taken of a desired phenomena. Those measurements are compared, in step 601, to alarm conditions. In step 602, a determination is made as to whether the alarm conditions have been met. If so, the probe triggers an alarm even in step 603. The alarm message is then assigned a high priority in step 604 for transmission to the central station.

If no alarm conditions are met, statistics are calculated in step 605 representing the measurements of the phenomena. The statistical values are assigned a medium priority, in step 606. At the same time, the raw measurements may be decimated in step 607 to reduce the total amount of measurement data on the probe. In step 608, the decimated measurements are assigned a low priority for transmission to the central station. In step 609, the decimated raw measurements are then stored in a local memory or local storage. In step 610, communications from the probe are transmitted to the central station according to the assigned priority level.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for managing bandwidth in a wireless probe measurement system comprising:
    receiving an indicator at said wireless probe to begin taking measurements of one or more variables;
    measuring said one or more variables; calculating a set of statistical values at said wireless probe using said measured one or more variables; and
    transmitting said set of statistical values to a central station.

2. The method of claim 1 further comprising:
    marking each measurement of said one or more variables with one or more of:
        a time of said measurement; and
        a location of said measurement.

3. The method of claim 1 further comprising:
    comparing said one or more variables to preset alarm conditions;
    setting an alarm state in response to finding an exceeded one of said preset alarm conditions.

4. The method of claim 3 further comprising:
    assigning a medium priority level to said set of statistical values;
    assigning a low priority to said measurements; and
    assigning a high priority to said alarm state.

5. The method of claim 3 wherein said transmitting step further comprises:
    checking for said high priority items prior to transmitting said set of statistical values;
    transmitting said high priority items before said transmitting of said set of statistical values; and
    transmitting low priority items when there are no high priority items and when there are none of said set of statistical values to transmit.

6. The method of claim 1 wherein said indicator comprises one or more of:
    passage of a predetermined time;
    passage of a predetermined distance by said wireless probe; and
    a combination of said passage of said predetermined time and distance.

7. The method of claim 1 wherein said calculating step comprises: calculating a set of statistics using said measured one or more variables.

8. The method of claim 1 wherein said calculating step comprises: calculating a set of intermediate statistical values using one or more variables.

9. The method of claim 8 wherein said calculating said set of intermediate statistical values uses one or more of:
    one or more variables measured by a plurality of wireless probes; and
    one or more variables measured within a single location by a single one of said plurality of wireless probes.

10. The method of claim 1 further comprising:
    storing said measured one or more variables in a storage device locally accessible by said wireless probe.

11. The method of claim 10 further comprising:
    decimating said measured one or more variables to reduce a size of said measured one or more variables prior to said storing.

12. The method of claim 1 further comprising:
    discarding said measured one or more variables after said calculating step.

13. The method of claim 1 wherein said wireless probe measurement system is logically divided into a grid, wherein said wireless probes measures for said phenomena in one or more bins of said grid.

14. The method of claim 1 further comprising:
    defining an region over which said wireless probe measures said one or more variables; and
    dynamically generating a statistical bin around said wireless probe, wherein an area of said statistical bin is defined by a relationship between said measured one or more variables.

15. The method of claim 14 further comprising:
calculating said set of statistical values using said measured one or more variables measured within said area of said statistical bin.

16. The method of claim 14 further comprising:
dynamically creating a new statistical bin responsive to new ones of said measured one or more variables differing from said calculated set of statistical values by a predetermined amount.

17. A wireless probe for measuring desired phenomena comprising:
a processor;
a transducer for capturing measurements;
code operable by said processor, for calculating statistical information on said captured measurements; and
a communication interface for transmitting said statistical information to a data clearinghouse.

18. The wireless probe of claim 17 further comprising:
a clock, wherein each of said captured measurements is stamped with a time of measurement from said clock.

19. The wireless probe of claim 17 further comprising:
a locator device, wherein each of said captured measurements is stamped with a location of measurement from said locator device.

20. The wireless probe of claim 17 wherein said code calculates statistical variables using said captured measurements.

21. The wireless probe of claim 17 wherein said code calculates intermediate statistical values using said captured measurements, wherein said intermediate statistical values are used by said data clearinghouse to analyze said desired phenomena.

22. The wireless probe of claim 17:
wherein said captured measurements are captured over a plurality of preset locations;
wherein said code calculates separate intermediate statistical values for separate areas within one or more of said plurality of preset locations using said captured measurements; and
wherein an aggregate statistical value is calculated for said one or more of said plurality of preset locations using said separate intermediate statistical values.

23. The wireless probe of claim 17 further comprising:
a storage interface for communicating said captured measurements to a local storage device.

24. The wireless probe of claim 23 further comprising:
dropping select ones of said captured measurements to reduce a size of said captured measurements prior to storing on said local storage device.

25. A method measuring desired phenomena using a wireless probe comprising:
measuring one or more variables related to said desired phenomena;
calculating statistical data at said wireless probe using said measured one or more variables, responsive to receiving a transition event notification; and
transmitting said statistical data to a central processing location.

26. The method of claim 25 further comprising:
stamping each measurement of said one or more variables with one or more of:
a time of said measurement; and
a location of said measurement.

27. The method of claim 25 wherein said measuring step is executed according to one or more of:

passing of a predetermined time;
passing of a predetermined distance by said wireless probe; and
a combination of said passing of said predetermined time and distance.

28. The method of claim 25 further comprising:
comparing said one or more variables to predetermined alarm condition;
creating an alarm message in response to finding a violated said predetermined alarm condition.

29. The method of claim 28 further comprising:
assigning a medium priority level to said statistical data;
assigning a low priority to said one or more variables; and
assigning a high priority to said alarm message.

30. The method of claim 28 wherein said transmitting step further comprises:
checking for said high priority items prior to transmitting said statistical data;
transmitting said high priority items before said transmitting of said statistical data; and
transmitting low priority items when there are no high priority items and when there are none of said statistical data to transmit.

31. The method of claim 25 wherein said calculating step comprises:
calculating statistical values using said measured one or more variables.

32. The method of claim 25 wherein said calculating step comprises:
calculating intermediate statistical data using one or more variables.

33. The method of claim 25 further comprising:
storing said measured one or more variables in a memory device local to said wireless probe.

34. The method of claim 33 further comprising:
decimating said measured one or more variables prior to said storing.

35. The method of claim 25 further comprising:
defining an area over which said wireless probe measures for said desired phenomena; and
overlaying a grid over said area, wherein said area is divided into a plurality of bins.

36. The method of claim 35 wherein said wireless probe calculates said statistical data for each of said plurality of bins for which said wireless probe measures said one or more variables related to said desired phenomena.

37. The method of claim 25 further comprising:
defining an area over which said wireless probe measures for said desired phenomena; and
dynamically creating a statistical bin around said wireless probe, wherein an area of said statistical bin is defined by a correlation between said measured one or more variables related to said desired phenomena.

38. The method of claim 37 further comprising:
calculating said statistical data using said measured one or more variables measured within said area of said statistical bin.

39. The method of claim 37 further comprising:
dynamically creating a new statistical bin responsive to new ones of said measured one or more variables differing from said calculated statistical data by a predetermined amount.

40. A method for analyzing desired phenomena in a defined area using a plurality of wireless probes, said method comprising:
dividing said defined area into a grid having a plurality of grid sections;

taking raw measurements related to said desired phenomena across said defined area;

determining a location of each of said raw measurements;

assigning each of said raw measurements to one of said plurality of grid sections responsive to said location falling within a perimeter of said one of said plurality of grid sections;

calculating statistical data at said wireless probe using said raw measurements; and communicating said statistical data to a central analysis center.

41. The method of claim 40 further comprising:

marking each of said raw measurements with a measurement time; and marking each of said raw measurements with a measurement location.

42. The method of claim 40 wherein said taking said raw measurements is responsive to one or more of:

a predetermined distance traveled by said wireless probe;

a predetermined time period elapsed; and a predetermined distance traveled when a predetermined period of time has also elapsed.

43. The method of claim 40 further comprising:

dividing said plurality of grid sections into further segments by one of said plurality of wireless probes;

compiling said statistical data by said one of said plurality of wireless probes according to said further segments; and aggregating said compiled statistical data corresponding to said further segments at said one of said plurality of wireless probes prior to said transmitting.

44. The method of claim 40 wherein said calculating step comprises:

calculating intermediate statistical values using said raw measurements.

45. The method of claim 40 further comprising:

storing said raw measurements and said statistical data in a memory local to said plurality of wireless probes.

46. The method of claim 45 further comprising:

deleting selected ones of said raw measurements prior to said storing.

* * * * *